United States Patent [19]

Chinchen et al.

[11] Patent Number: 4,863,894
[45] Date of Patent: Sep. 5, 1989

[54] PROCESS FOR THE MANUFACTURE OF A CATALYST

[75] Inventors: Godfrey C. Chinchen, Spennymoor; James R. Jennings, Yarm, both of England

[73] Assignee: Imperial Chemical Industries PLC, London, England

[21] Appl. No.: 209,572

[22] Filed: Jun. 21, 1988

[30] Foreign Application Priority Data

Jun. 22, 1987 [GB] United Kingdom ............... 8714539

[51] Int. Cl.$^4$ .................. B01J 21/02; B01J 21/10; B01J 23/06; B01J 23/72
[52] U.S. Cl. ................................. 502/342; 502/340; 502/341; 502/343
[58] Field of Search ............... 502/244, 307, 318, 340, 502/341, 342, 343

[56] References Cited

U.S. PATENT DOCUMENTS

| | | | |
|---|---|---|---|
| 3,326,956 | 6/1967 | Davies et al. | 502/307 X |
| 3,615,217 | 10/1971 | O'Brien et al. | 502/343 X |
| 4,711,773 | 12/1987 | Mesters et al. | 502/244 X |

FOREIGN PATENT DOCUMENTS

| | | |
|---|---|---|
| 609166 | 9/1948 | United Kingdom . |
| 1010478 | 11/1965 | United Kingdom . |
| 1369021 | 10/1974 | United Kingdom . |
| 1369475 | 10/1974 | United Kingdom . |
| 1405012 | 9/1975 | United Kingdom . |
| 2014867 | 9/1979 | United Kingdom . |
| 2095233 | 9/1982 | United Kingdom . |

*Primary Examiner*—W. J. Shine
*Attorney, Agent, or Firm*—Cushman, Darby & Cushman

[57] ABSTRACT

A catalyst suitable for a carbon oxides conversion process comprises metallic copper and oxides of zinc and/or magnesium and has a copper metal surface area of at least 70 m$^2$ per g of copper.

Whereas conventional catalysts are normally made by forming an intimate mixture of discrete particles of compounds of copper, and zinc and/or magnesium, and optionally at least one other element such as aluminum, calcining the composition to convert the constituents to oxides and then subjecting the calcined composition to reduction conditions so that the copper compounds therein are converted to copper, the high copper area catalysts are made by a process in which the calcination stage is omitted so that the copper compounds in the intimate mixture are reduced to metallic copper without the intimate mixture being heated to a temperature above 250° C.

Where the catalyst is required in pelleted form, it is preferably pelleted after reduction.

6 Claims, No Drawings

PROCESS FOR THE MANUFACTURE OF A CATALYST

CATALYSTS

This invention relates to catalysts and in particular to a copper-containing catalyst for use in carbon oxide conversion reactions such as the low temperature shift reaction $CO + H_2O \rightarrow CO_2 + H_2$ and methanol synthesis $CO + 2H_2 \rightarrow CH_3OH$ $CO_2 + 3H_2 \rightarrow CH_3OH + H_2O$ The catalyst for such processes is generally produced by forming into pellets small discrete particles of an intimate mixture of copper oxide and one or more other oxidic materials, generally including zinc oxide, that are not reduced under the conversion reaction process conditions, and then subjecting the pellets to reducing conditions to reduce the copper oxide in said pellets to metallic copper. Generally the intimate mixture is made by precipitation of copper compounds and compounds convertible to the other oxidic materials, and/or precipitation of the copper compounds in the presence of the other oxidic materials or compounds convertible thereto, following by calcination to convert the precipitated copper compounds, and other components as necessary, to the oxides.

By such precipitation/calcination/reduction techniques, the catalysts generally have a copper surface area above 20 $m^2$ per g of copper, often above 40 $m^2$ per g of copper. However the maximum copper surface area obtainable is generally no more than about 65 $m^2$ per g of copper.

It has been proposed in US-A-4711773 to use such a precipitation/calcination/reduction technique to produce copper containing shift catalysts wherein the copper is supported by a refractory oxide such as silica and a significant proportion of the copper is present as particles of size less than 20 nm. In an Example in this reference, the catalyst is said to have a copper surface aea of 63 $m^2$ per g of copper.

Since the activity of the catalysts depends directly on the surface area of the copper (as measured by the nitrous oxide decomposition method, eg as described in the article by Evans et al. in Applied Catalysis 1983, 7, 75–83 - a particularly suitable technique is described in EP-A-202824), it is desirable to obtain catalysts with higher copper surface areas. We have now devised catalysts of significantly increased copper surface area.

According to the invention a carbon oxides conversion process comprises reacting a carbon oxide containing process gas containing hydrogen and/or steam and containing at least one of hydrogen and carbon monoxide in the presence of a catalyst containing metallic copper and zinc and/or magnesium oxide and having a copper metal surface area of at least 70 $m^2$ per g of copper.

The invention also provides a catalyst containing metallic copper and zinc and/or magnesium oxide and having a copper metal surface area of at least 70 $m^2$ per g of copper.

The copper metal surface area is preferably in the range 80–200, for example 85–140, $m^2$ per g of copper. It is believed that areas above 200 $m^2$ per g would be still more advantageous since in general it is observed that the activity of such catalysts is approximately proportional to copper surface area.

In addition to metallic copper, the catalyst can contain one or more other metals having catalytic activity: where the process is alcohol synthesis, examples of such other metals are palladium, rhodium, or ruthenium. Optionally metallic silver can be present.

The copper content of the active catalyst is typically in the range 10–80%, especially 15–70%, by weight. Within this range a copper content in the range 50–70% by weight is of general application for methanol synthesis at under 320° C. whereas for the shift reaction the copper content is generally somewhat lower, particularly in the range 15–50% by weight. Other catalytically active metals, if present, are normally present in relatively low proportions; the proportion of such other catalytically active metals is typically 1–10 atoms of such metals per 100 atoms of copper. It will be appreciated that in some systems, for example alcohol synthesis employing a carbon dioxide containing synthesis gas, a minor proportion of the copper may be in the form of copper oxide.

Copper containing catalysts suffer from the problem that the copper atoms tend to sinter together giving a decrease in the copper surface area after a period of use at elevated temperature with consequent loss of activity. In order to alleviate this disadvantage, the catalyst contains at least one oxidic material, including zinc oxide and/or magnesium oxide, that is not reduced to metal under the process conditions. Usually the zinc, and/or magnesium oxide is present, to the extend of a total of 0.3 to 2.5 zinc and magnesium atoms per atom of copper. For alcohol synthesis catalysts there are preferably a total of 0.3 to 0.6 zinc and magnesium atoms per copper atom, while for shift catalysts there are preferably a total of 1 to 2.5 zinc and magnesium atoms per copper atom. Preferably the total content of zinc oxide and magnesium oxide as at least 20%, particularly at least 25%, by weight. It is preferred that at least half of the total zinc and magnesium atoms are zinc atoms.

If desired oxides of at least one other element X that are not reduced under the process conditions can be present. Examples of suitable element X oxides include oxides of aluminium, vanadium, chromium, titanium, zirconium, thorium, uranium, molybdenum, tungsten, manganese, silicon, and the rare earths. Boron oxide can be present, especially with alumina. Alumina, chromia and vanadia are especially preferred.

Generally the amount of element X oxides is such that the atoms X form 2–50%, especially 4–30%, of the total number of copper, zinc, magnesium, and element X atoms. If a trivalent oxide is present it is preferably at least partly combined with the zinc oxide and/or mangesium oxide as spinel.

It is preferred that as the copper surface area and/or the process temperature is increased, the proportion of zinc oxide and/or magnesium oxide and/or element X oxides is increased. Thus it is preferred that at process temperatures above 260° C. and/or at copper surface areas above 100 $m^2$ per g of copper, the copper atoms form less than 50% of the total number of copper, zinc, magnesium, and element X atoms.

As mentioned above, copper-containing catalysts are conventionally prepared by forming an intimate mixture of particles of compounds of copper, and zinc and/or magnesium, and element X, if present, calcining the mixture, often in an oxygen-containing atmosphere, usually air, to convert those compounds to oxides, pelleting, and reduction. The calcination is normally effected at temperatures in an excess of 250° C., and is generally effected at temperatures in the range 300 ° to 350° C. The reduction step is normally carried out in the reactor where the carbon oxide conversion process is to be effected: thus normally a catalyst precursor in which the copper is present in the form of copper oxide is charged to the reactor and the reduction effected by passing a suitable gas mixture therethrough.

In the present invention, in order to obtain the high copper surface areas, the calcination step is omitted, and the intimate mixture is subjected to reduction conditions so that the copper compounds therein are converted to copper without an initial discrete step of heating to convert the copper compounds to copper oxide.

Thus the present invention also provides a process for the manufacture of a catalyst comprising forming a composition comprising an intimate mixture of discrete particles of compounds of copper, and zinc and/or magnesium and, optionally, at least one element X selected from aluminium, vanadium, chromium, titanium, zirconium, thorium, uranium, molybdenum, tungsten, manganese, silicon, and the rare earths, and subjecting the composition to reduction conditions so that the copper compounds therein are converted to copper, characterised in that the copper compounds in the intimate mixture are reduced to metallic copper without heating said intimate mixture to a temperature above 250° C.

The copper compounds in the intimate mixture are chosen such that they can be reduced to metallic copper without the need for heating to above 250° C. Preferably the compounds are chosen such that the temperature at which they can be reduced to copper does not exceed 200° C. Likewise zinc, magnesium, and element X compounds are incorporated into the intimate mixture as oxides or as compounds that decompose to oxides at temperatures below the highest temperature to which the composition is subjected prior to, or during, reduction. Suitable compounds include labile oxycompounds such as hydroxides, carbonates, oxalates, and carboxylates and combinations thereof.

Since there is no calcination step prior to reduction, it is preferred that the intimate mixture is not pelleted prior to reduction because the intra-pellet voidage resulting from the decomposition of such oxycompounds, during which water and/or carbon dioxide is evolved, can result in low mechanical strength and thus short process life. Therefore one or more of the following measures (insofar as mutually compatible) is preferably adopted where a fixed catalyst bed is required:

(a) pelleting the catalyst composition after reduction; possibly with operation in an oxygen-free atmosphere or after a passivation by dilute oxygen or carbon dioxide or coating with an oxygen barrier material;

(b) mixing the labile compounds with a binder material, such as a hydraulic cement whose mechanical strength is not decreased too much by subjection to catalyst reduction conditions and the carbon oxides conversion process conditions;

(c) applying the labile compounds, possibly with binder material such as alumina sol, to the surface of a pre-formed catalyst support structure made of an oxidic material, an alloy, or graphite.

The reduction of the labile compounds can be applied to dried, possibly agglomerated, material in the solid state or in the presence of liquid. The reduction normally converts at least 50% of the reducible compounds to metal but may be incomplete, so as to produce a catalyst at the oxidation level it will assume in a carbon dioxide containing process gas, or a catalyst requiring the final part, eg the final 10–20%, of reduction by the gas used in the carbon oxides conversion process.

The intimate mixture can be made for example by wet treatment of oxides, such as by reacting copper oxide, zinc oxide, chromate and ammonia together or by mixing soluble metal compounds. More conveniently it is made by double decomposition of metal nitrates with an alkaline precipitant, for example as described in our GB-A-1010871, 1159535, 1296212 and 1405012. The reaction and after-treatment conditions can be chosen to produce definite crystalline compounds for example of the Manasseite, Aurichalcite or Malachite type.

If the labile compounds as made by double decomposition contain alkali metal salts, they are normally washed with water until alkali-free and then dried. Part at least of the drying stap can be carried out by means of a solvent and, in any event, drying can be completed while the compounds are suspended in the liquid. If desired, the labile compounds can be agglomerated, for example by spray-drying or wet granulation, to facilitate handling or to afford a more convenient particle size when in suspension. They should, however, suffer little if any thermal decomposition.

Suspension of the compounds in the liquid can be by mere stirring, the vigour of stirring depending on the tendency of the particles to settle. If desired, a polymer can be present in solution to inhibit settling. To improve the available surface of the particles and possibly also to expose fresh active surface the particles can be kneaded with the liquid.

As a preliminary to reduction, the labile compounds can be subjected to stepwise decomposition to remove initially water of crystallisation and thereafter part of their content of water and/or carbon dioxide, especially if these are held at distinguishable levels of lability.

Reduction of the compounds of the active metals can be effected by means of a dissolved reductant such as an aldehyde, hydrazine or hydroxylamine or a catalytically dehydrogenatable compound such as piperidine or a hydrogenated nephthalene. More conveniently hydrogen or carbon monoxide or process gas is used, at atmospheric or higher pressure. In either event, reduction is carried out preferably at the lowest temperature at which it will proceed; and therefore the reductant concentration (in solution or gas phase) and temperature should be increased slowly to minimise local heating. If desired, there can be present a sufficient partial pressure of steam and/or carbon dioxide to limit decomposition of hydroxides and carbonates to oxides. Generally it is found that reduction begins at about 80° C. and is sufficiently complete by 200° C. or even 150° C.

Where the carbon oxide conersion process is the shift reaction it is particularly the low temperature shift (LTS) reaction. The catalyst has useful activity at temperatures above 150° C., but the lower temperature limit is in practice determined by the partial pressure of steam in the reaction mixture and is usually kept high enough to prevent condensation, suitably over 180° C. for most shift processes. The upper temperature limit appears to be about 400° C. for the most stable catalysts according to the invention.

Within the broad temperature range the invention provides two particular processes. One is a conventional low temperature shift (LTS) process at an outlet temperature in the range 200°–250° C. The other is a medium temperature shift (MTS) process at an outlet temperature in the range 250°–400° C., especially 300°–350° C.

In the conventional LTS process the reactant gas typically contains 1–5% v/v of carbon monoxide on a dry basis and the steam to dry gas ratio is typically in the range 0.3 to 1.5. The outlet carbon monoxide content is typically 0.1 to 0.6% v/v on a dry basis. Such a reactant gas is commonly the product of a high temperature shift (HTS) process over an iron-chrome catalyst at an outlet temperature in the range 350°–500° C., such that the carbon monoxide content is decreased from a level of 5–20% to the inlet level of the LTS. The HTS inlet gas is typically the product of steam reforming or partial oxidation of hydrocarbons. The LTS process is usually in an adiabatic catalyst bed but proposals have been made to operate in isothermal conditions, particularly with the catalyst in tubes surrounded by boiling water under pressure: then, as a result of continuous heat removal, a greater inlet CO content is practicable.

The pressure for the conventional LTS process is typically in the range 1–50 bar abs., but can be higher, for example up to 150 bar abs. in he MTS process.

Where the process is alcohol synthesis, a selection is made from among the catalysts according as it is desired to make 1. substantially pure (over 98% w/w) methanol, apart from possibly a content of water, which is routinely separable; or
2. alcohol mixtures containing substantial quantities of higher alcohols, chiefly $C_2$–$C_5$, in addition to methanol; or
3. methanol transformation products, especially dimethyl ether or methyl formate or, with more process downstream modification, olefins or aromatics.

For process 1 the catalyst should preferably be substantially free of alkali metal compounds, for example contain less than 0.3% w/w thereof calculated as equivalent $Na_2O$ and, if other oxides are present, these should be in forms not causing side reaction; for example, alumina should be in one or more forms not having dehydrating activity.

For process 2 such alkali metal compounds, preferably potassium, in an amount of eg 0.2 to 0.7% by weight, and/or cobalt compounds are desirably present.

For process 3 one or more of active alumina, non-crystalline aluminosilicates, crystalline silicates such as "Silicalite", or zeolites such Nu-3 or ZSM-5, are desirably present.

The synthesis is carried out at a pressure typically in the range 20–150, especially 30–120, bar abs. The temperature is typically in the range 120°–270° C. when methanol is to be the main product but up to 100° C. higher when higher alcohols are to be produced. Because of the unconventionally high activity of the catalyst the synthesis can be effected at low temperatures, preferably below 200° C., and the space velocity in volumes of gas per unit weight of catalyst is at least 5000 and can be very high, for example in the range 10000 to 80000, liters per kg of catalyst per hour and the space time yield is typically in the range 1.5 to 4.0 kg per kg of catalyst per hour. The synthesis gas used can contain hydrogen in stoichiometric deficiency with respect to carbon monoxide or carbon dioxide or both. More conveniently for methanol synthesis it contains carbon monoxide and 1–10% by volume of carbon dioxide and at last sufficient hydrogen to react with both carbon oxides present.

As mentioned hereinbefore pelleting of the catalyst precursor before reduction is liable to give catalysts of poor strength, and so, if a fixed bed system is desired other techniques such as those mentioned hereinbefore are desirable. Alternatively for alcohol synthesis reactions, instead of using a fixed bed catalyst, the catalyst may be suspended in a liquid. While in principle the particles obtained by the aforementioned techniques for obtaining a catalyst suitable for use in a fixed bed could also be used in suspension in a liquid, it is preferred to use the labile compounds as powder or in some small particle form agglomerated to an extent short of what is needed in a fixed bed process.

In such a suspension process the liquid should be substantially inert in the conditions of catalyst reduction and synthesis. It need not be the same for these two stages. The liquid present during synthesis should normally be readily separable from methanol and (if necessary) alcohols up to $C_5$. Thus it peferably has a boiling point more than 5° C. different from that of methanol and, unless a more complicated distillation is envisaged, does not form an azeotrope with methanol. Alternatively, if the methanol is to be reacted further, for example by dehydration, conversion to hydrocarbon, etherification or esterification, the liquid should be readily separable from the products of those further reactions. Separability is of course not needed if the liquid chosen is to be a constituent of a product mixture.

Examples of suitable liquids are aliphatic, cycloaliphatic and aromatic hydrocarbons, alcohols and esters, provided they are free of ethylenic or acetylenic unsaturation.

Suitable methanol synthesis processes in presence of liquid are described in GB-A-1413929 and EP-A-34011, and in Hydrocarbon Processing May 1984, page 41.

The invention is illustrated by the following examples:

EXAMPLE 1

A basic carbonate catalyst precursor containing compounds of copper, zinc and aluminium in the atomic ratio Cu 59.8, Zn 25.6, Al 14.6 was made by the method described in GB-A-1405012, that is (a) double decomposition at 65° C. of aqueous solutions of zinc nitrate and sodium aluminate in the proportion of 2 moles of sodium aluminate per mole of zinc nitrate;

(b) neutralisation of the resulting slurry with nitric acid;

(c) in a separate vessel, double decomposition at 65° C. of an aqueous solution of copper and zinc nitrates in the molar proportions of about 3 moles of copper nitrate to one mole of zinc nitrate with sodium carbonate solution;

(d) mixing the products of (b) and (c) in the proportions required to give the copper, zinc, and aluminium in the aforesaid atomic ratio;

(e) collecting the solid on a filter, washing to less than 0.2% $Na_2O$ (by weight with the components expressed as oxides) and drying at 110° C.

The dried filter cake, a friable solid, was powdered by rubbing through a fine sieve. Samples of the powder were reduced to active catalyst by means of a mixture of 5% $H_2$+95% $N_2$ by volume. The copper area of the catalysts, as measured by the nitrous oxide decomposition method, was as follows:

| Reduction temperature and time | Copper area, $m^2g^{-1}$ of copper |
| --- | --- |
| 140° C., 2 h | 113 |
| 150° C., 2 h | 130 |

Such an area is substantially higher than that (about 45–55 $m^2g^{-1}$) observed for a catalyst made by calcining the dried filter cake to oxides before reduction.

The catalyst is ready for dispersion into a liquid or for shaping into fixed bed form.

EXAMPLE 2

Samples of the dried powdered filter cake catalyst precursor were reduced to active catalyst by passing a mixture of nitrogen (95% v/v) and hydrogen (5% v/v) over the powder overnight at different temperatures. The reduced catalysts were then cooled to ambient temperature under nitrogen and then passivated by passing a gas stream of nitrogan (99.5% v/v) and oxygen (0.5% v/v) over the reduced catalyst until no further reaction occurred, then passing a stream of nitrogen (99% v/v) and oxygen (1% v/v) over the partially passivated catalyst until no further reaction occurred, and then by passing a stream of nitrogen (98% v/v) and oxygen (2% v/v) over the partially passivated catalyst until no further reaction occurred by which time the passivation is essentially complete and the catalyst can be handled in air with no further reaction. The samples were then pelleted using 1% by weight of graphite as a pelleting aid.

For comparative purposes another sample of the dried powdered filter cake was calcined at 300° C. for 6 hrs. and then pelleted to give a conventional catalyst precursor.

The copper surface areas of each material (after reduction of the conventional precursor and re-reduction of the passivated pre-reduced materials) was determined by reactive frontal chromatography s described in EP-A-202824, giving the following results:

| Reduction Temperature (°C.) | Calcination | Copper surface Area ($m^2$ per g Cu) |
| --- | --- | --- |
| 150 | no | 83.7 |
| 160 | no | 89.6 |
| 180 | no | 93.1 |
| 200 | no | 80.2 |
| 230 | yes | 52.6 |

The low temperature shift activity of the sample reduced at 180° C. and the conventional precursor was assessed by crushing the pelleted sample, charging a known weight (about 0.5 g) of the crushed material to a microreactor maintained at 190° C., and passing a mixture of steam (33.3% v/v), nitrogen (14.8% v/v), carbon dioxide (6.1% v/v), carbon monoxide (5.7% v/v), and hydrogen (33.3% v/v) through the crushed sample at a pressure of 14.8 bar abs and at a space velocity of 75000 $hr^{-1}$.

When the composition of the exit gas had reached steady state conditions, indicating that the conventional precursor had been reduced and the passivated pre-reduced sample had been re-reduced, the exit gas was analysed to determine the proportion of the carbon monoxide that had been converted. Over the duration of the experiment the proportion of carbon monoxide converted by the conventional material varied between 60 and 62% whereas with the material in accordance with the invention, the proportion of carbon monoxide converted varied between 68% and 69%, indicating that the material of the invention had a significantly increased activity.

We claim:

1. A process for the manufacture of a catalyst comprising
   (a) forming an intimate mixture of precipitated compounds of copper, and of at least one metal selected from zinc and magnesium, by precipitation from an aqueous solution of salts of copper and said at least one metal using an alkali metal carbonate as precipitant, and
   (b) without heating said mixture to a temperature above 200° C., converting the precipitated compounds of said at least one metal to oxides and reducing the precipitated copper compound in said mixture to metallic copper, the maximum temperature at which said reduction is effected being in the range 150° to 200° C.,
   whereby the copper metal surface area of said catalyst is at least 70 $m^2$ per gram of copper.

2. A process according to claim 1 wherein said intimate mixture also contains precipitated zinc and aluminum compounds formed by double decomposition of zinc nitrate and sodium aluminate.

3. A process according to claim 2 wherein the proportions of said precipitated compounds in said mixture are such that the catalyst contains 10 to 80% by weight of copper.

4. A process according to claim 2 wherein the proportions of said precipitated compounds in said mixture are such that the catalyst contains a total of 0.3 to 2.5 atoms of zinc and magnesium (if present) per atom of copper.

5. A process according to claim 2 wherein the proportions of said precipitated compounds in said mixture are such that the aluminum atoms constitute 4 to 30% of the total number of copper, aluminum, zinc, and magnesium (if present) atoms.

6. A process according to claim 1 wherein after reduction of the copper compounds, the composition is pelleted.

* * * * *